(12) United States Patent
Richard et al.

(10) Patent No.: US 7,565,227 B2
(45) Date of Patent: Jul. 21, 2009

(54) MULTI-BUILDING CONTROL FOR DEMAND RESPONSE POWER USAGE CONTROL

(75) Inventors: Amy Richard, Newton, MA (US); Peter Kelly-Detwiler, Scituate, MA (US); Joseph Franz, Baltimore, MD (US)

(73) Assignee: Constellation Energy Group, Inc., Baltimore, MD (US)

( * ) Notice: Subject to any disclaimer, the term of this patent is extended or adjusted under 35 U.S.C. 154(b) by 232 days.

(21) Appl. No.: 11/889,632

(22) Filed: Aug. 15, 2007

(65) Prior Publication Data

US 2009/0048718 A1  Feb. 19, 2009

(51) Int. Cl.
G05D 3/12 (2006.01)
G05D 5/00 (2006.01)
G05D 9/00 (2006.01)
G05D 11/00 (2006.01)
G05D 17/00 (2006.01)
G01R 21/00 (2006.01)
G01R 21/07 (2006.01)
G06F 17/30 (2006.01)
G06F 1/00 (2006.01)

(52) U.S. Cl. .................. 700/291; 700/286; 700/295; 702/61; 702/62; 705/10

(58) Field of Classification Search .............. 700/286, 700/291, 295; 702/61–62; 705/10
See application file for complete search history.

(56) References Cited

U.S. PATENT DOCUMENTS

| | | | |
|---|---|---|---|
| 6,216,956 B1 * | 4/2001 | Ehlers et al. ............... 236/47 |
| 6,785,592 B1 * | 8/2004 | Smith et al. ............... 700/291 |
| 6,874,691 B1 * | 4/2005 | Hildebrand et al. ........ 236/51 |
| 7,409,303 B2 * | 8/2008 | Yeo et al. ................... 702/60 |
| 2003/0009401 A1 * | 1/2003 | Ellis .......................... 705/35 |
| 2004/0024483 A1 * | 2/2004 | Holcombe ................. 700/122 |
| 2004/0095237 A1 | 5/2004 | Chen et al. |
| 2004/0103329 A1 | 5/2004 | Morisawa |
| 2004/0225649 A1 * | 11/2004 | Yeo et al. ................... 707/3 |
| 2006/0065750 A1 * | 3/2006 | Fairless .................... 236/46 R |
| 2007/0100503 A1 | 5/2007 | Balan et al. |

(Continued)

OTHER PUBLICATIONS

International Search Report and Written Opinion mailed Nov. 3, 2008 in PCT/US08/09700.

*Primary Examiner*—Ramesh B Patel
(74) *Attorney, Agent, or Firm*—Davidson Berquist Jackson & Gowdey LLP (57) ABSTRACT

An energy usage coordinator controls the energy usage of individual buildings of a group (or portfolio) of buildings in one or more load zones. These buildings have all contracted with an energy company which controls (directly or indirectly) the energy usage coordinator. By agreeing to lower energy usage during times of peak usage (when the energy company may otherwise have to pay very high prices on the spot or short term market), the owners or managers of the buildings receive a preferential energy rate from the energy company. Such a preferential rate may be in the form of a fixed rate reduction or a variable rate reduction. Alternatively, the energy company may determine that the energy is currently selling for twice what its building portfolio has contracted to pay for it so it requests some portion of the portfolio to reduce usage so that it can sell the excess/saved energy in the market.

38 Claims, 8 Drawing Sheets

U.S. PATENT DOCUMENTS

2007/0124026 A1 5/2007 Troxell et al.
2008/0177678 A1* 7/2008 Di Martini et al. .......... 705/412
2008/0272934 A1* 11/2008 Wang et al. ............ 340/870.11

* cited by examiner

MULTI-BUILDING CONTROL FOR DEMAND RESPONSE POWER USAGE CONTROL

CROSS REFERENCE TO RELATED APPLICATIONS

The present application is related to the following applications, each of which is incorporated herein by reference: (1) application Ser. No. 11/889,633, entitled Multi-Input Building Controller, filed on even date and (2) application Ser. No. 11/889,706, entitled Energy Usage Prediction and Control System and Method, filed on even date.

FIELD OF INVENTION

The present invention is directed to the field of demand response power usage control and in one embodiment to an interactive, real-time system for controlling the power usage in multiple buildings to achieve power reduction during times of increased power demand.

DISCUSSION OF THE BACKGROUND

Electrical power control can be divided into several distinct processes: generation, transmission (including independent service operators), distribution and supply (wholesale and retail). Each of these processes can potentially be provided by a different energy company or service provider. However, each such company cannot operate in a vacuum as the amount of power generated must match the amount of power consumed. Moreover, since the amount of power that can be generated at any point in time is finite, there are cost considerations with requiring (and therefore buying) additional electricity without advanced notice. Typically in high demand times, the cost of buying electricity in the spot market (i.e., short-term market) is higher than had the electricity been purchased in advance such that additional generation could have been planned in advance.

BRIEF DESCRIPTION OF THE DRAWINGS

The following description, given with respect to the attached drawings, may be better understood with reference to the non-limiting examples of the drawings, wherein.

DISCUSSION OF THE PREFERRED EMBODIMENTS

Figure 1:
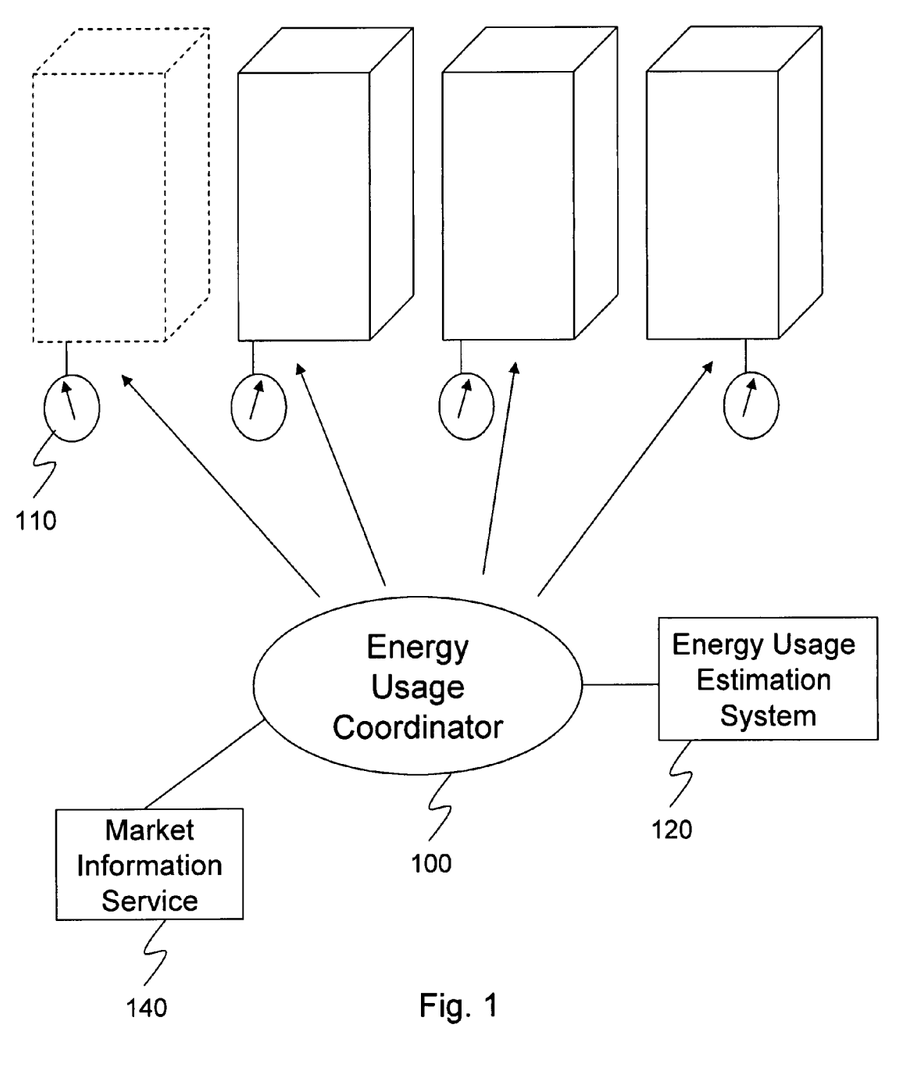
FIG. 1 is a schematic illustration of an energy usage coordinator controlling the energy usage of individual buildings of a group (or portfolio) of buildings.

Turning to FIG. 1, an energy usage coordinator 100 is arranged to control the energy usage of individual buildings of a group (or portfolio) of buildings in one or more load zones. These buildings have all contracted with an energy company which controls (directly or indirectly) the energy usage coordinator. By agreeing to lower energy usage when called upon, the owners or managers of the buildings receive a preferential energy rate from the energy company. Such a preferential rate may be in the form of a fixed rate reduction or a variable rate reduction. Fixed rate reductions include, but are not limited to, a fixed reduced rate for the year, a fixed reduced rate for the month(s) that the building(s) reduced energy usage on demand, a fixed reduced rate for the day(s) that the building(s) reduced energy usage on demand, a fixed rate for the hours that the buildings reduced energy usage on demand. For example, if a building would be able to contract for $0.019/kW hr for its energy usage over the whole year, it may instead be able to contract for $0.018/kW hr for its energy usage over the whole year if it agrees to reduce its energy usage on demand (whether it ever is called on to reduce demand or not). Alternatively, the building may instead be able to contract for $0.0185/kW hr for its energy usage over the whole year if it agrees to reduce its energy usage on demand plus it receives a rebate of $100/month or $10/day for each month or day that it actually reduces energy usage on demand. Other fixed reductions are also possible.

Variable rate reductions include, but are not limited to, a sharing of the percentage of the cost that the energy company would have otherwise incurred had the building not reduced its energy usage. For example, if during a peak demand time the energy company would have had to purchase $100 more of electricity in the market had the building not reduced its energy usage, and instead the energy company only had to buy $20 of electricity, the energy company could provide the building with a $40 credit or payment representing half of the energy company's savings. Similarly, if a building has reduced energy needs (and therefore excess energy available compared to previous predictions), the building may sell its excess capacity to the energy company for a percentage (e.g., 75%) of what the energy company can obtain for it in the market. Other percentages and variable rates are also possible. The energy company could likewise utilize a combination of fixed and variable rate reductions, and/or customer credits or payments in order to better suit its or its customers' needs.

The energy usage coordinator includes a sufficient number of energy usage meters 110 to measure energy usage at the various buildings in the portfolio. The energy usage meters might also measure the energy use within specific buildings if the load being curtailed is all on one circuit or area or if the load drop is being provided by a generator behind (on the customer side of) the master meter.

Exemplary conditions which may cause the building to be called upon to lower usage include, but are not limited to, prices are high or the electric grid cannot supply enough power to specific points. Thus, when a building is called upon to reduce energy usage, it may or may not be based on the marginal price of electricity to those points. For example, a condition where price is a factor is when the energy company needs to obtain more power than expected on behalf of its customers and it is a period of peak usage such that the energy company may have to pay a very high price on the spot or short term market. Alternatively, a condition where price is not a factor is when an energy company has an emergency need to regulate voltage or the transmission grid is constrained, and it is requesting that buildings reduce energy usage to help with that regulation/constraint. The buildings that respond may still obtain financial consideration for compliance with the reduction request, but there is no a market per se for such requests.

Accordingly, the energy usage coordinator preferably includes an energy usage estimation system 120 that tracks and/or estimates the amount of energy that the energy company has already contracted to purchase to determine whether it predicts that the buildings in its portfolio are going to need more energy than was previously expected (e.g., by its long term or mid term models). Preferably the energy usage coordinator also includes a communications adapter with which it can receive emergency (and other) requests relating to the health and/or operation of the grid(s).

The amount that a building is to reduce, if called upon to reduce by an energy company, can be a negotiated amount, an amount given by a formula, or an amount given by a marginal demand curve. The marginal demand curve is given with respect to an energy baseline. As used herein, the term "baseline" shall be understood to mean what the building would have used at its contracted rates under normal operating conditions without any actions by the energy usage coordinator.

For an individual building, the marginal demand curve for electricity is based on the value of the electricity at any point in time in the future. The value of electricity is determined by a formula or by the property owner that varies by building type. The inputs into this formula may come from various sources, including, but not limited to, monitors in the building, market data and other environmental data such as weather forecasts. For example in a retail store the value of electricity is highest during open hours and when the store is full. In a manufacturing setting the value of the electricity might be the gross margin generated on an incremental unit produced at the manufacturing facility. In an office building the value of electricity might be a function of the time of day, weekend/weekday and number of people in the building, temperature forecast for the rest of the day. If there is a generator present the value of electricity might be determined by what it would cost to run the generator.

Figure 7:
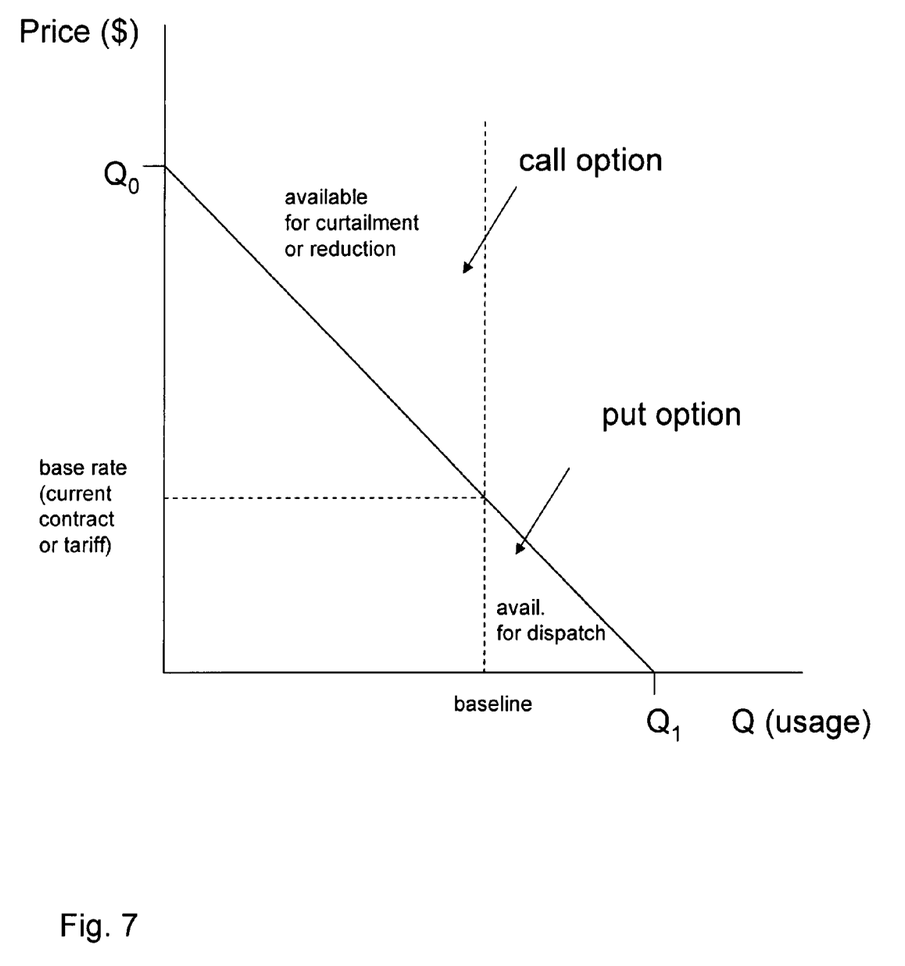
FIG. 7 is a marginal demand curve for a particular future time showing the trade off between price and how much energy a consumer (e.g., a building) is willing to consume at that price at that time.

As shown in FIG. 7, the marginal demand curve shows the trade off between price and how much energy this building is willing to consume at that price. The amount of energy consumption also would be constrained by the operational ranges for the building which therefore control a minimum ($Q_0$) and a maximum ($Q_1$) energy that can be used by the building at any one time. Exemplary ranges for a building include, but are not limited to, a lighting range (e.g., in lumens), a temperature range, an air flow range (e.g., in cubic feet per second), and/or an up-time or down-time range (e.g., the amount of time that an engine or process must be up or may be down, for example as measured in hours per day, month or year). As illustrated, the usage (or load) that a customer is willing to curtail or allowed to be "called" on is the area to the left of the baseline and above the marginal demand curve (and above the base rate defined by a current contract or tariff). The energy that a customer is willing to dispatch or allow the energy controller to "put" into its building is represented by the area to the right of the baseline and below the marginal demand curve (and below the base rate defined by a current contract or tariff). The energy controller can either bid these put and call options into the market to maximize the price or exercise the put and call options based on market prices.

Figure 8:
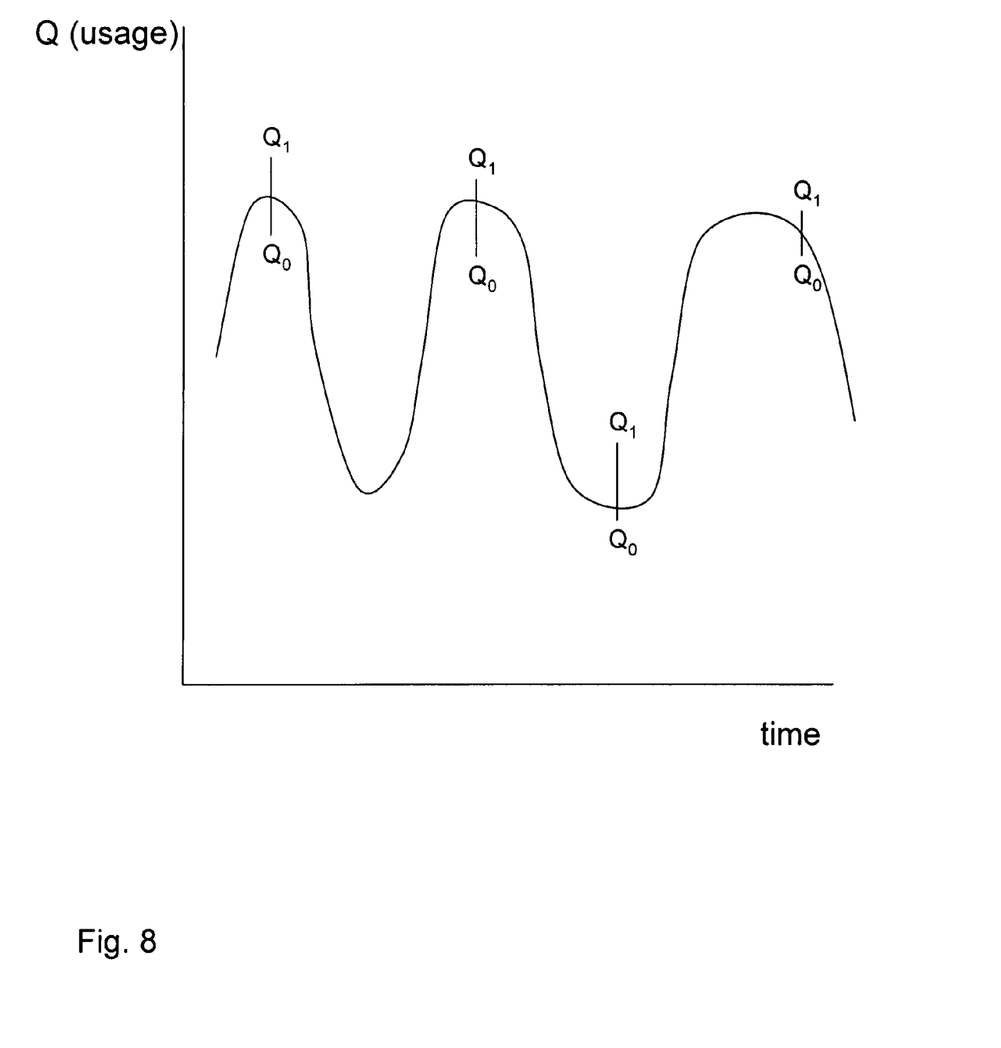
FIG. 8 is a usage curve showing minimum, predicted and maximum usage versus time.

On a periodic basis (hourly, daily, monthly, annually) the system or an agent for the system would develop the marginal demand curve for electricity for some future period (next hour, next 24 hours, next X hours for up to X years) through either a formula or through manual input (e.g., by the property owner or his agent). The marginal demand curve could be calculated for a building (1) manually, (2) by formula within a building automation system or gateway or (3) by the energy usage coordinator. As shown in FIG. 8, the minimum and maximum energy utilization of a building may change over time (e.g., based on what processes are on-going, external temperature, number of clients, etc.). Similarly, the differential between the minimum and maximum energy utilization of a building may change over time.

In cases where the price of electricity (energy, capacity, ancillary services, T&D) for a future period (tomorrow, next X days, next X months, next X years) has not been fixed yet the energy usage coordinator would "bid" the available load into the market for the appropriate period. Based on what bids the market accepts the energy usage coordinator would then wait until the appropriate time for which the bids were selected and request reductions in usage at corresponding buildings.

Baseline usage estimates can be determined through a number of different models and formulas. The formulas will vary by type of program or type of energy product being delivered by the energy coordinator. Example baselines include, but are not limited to, the average of the 3 highest days in the last 10 days excluding event days, a regression based on past usage and the weather, and the average of the highest 5 days from last year.

When using a marginal demand curve, the marginal demand curve data from the buildings would then be transmitted to the energy usage coordinator who would then add up all the demand curves by a price point. This would create a portfolio demand curve. The energy usage coordinator would then take information from at least one energy market and determine the cost of electricity through the use of pricing formulas for the portfolio as a whole and for individual facilities in the portfolio. Then the energy usage coordinator would choose which buildings to curtail based on the marginal value of the electricity used by the building and marginal cost electricity. Buildings that value the electricity below the cost of the electricity would be curtailed first. Buildings that value the electricity the highest would be curtailed last.

As illustrated in FIG. 1, the energy company (through an energy usage coordinator) can send a signal to a first building (represented as a dashed building) in its portfolio of client buildings to ask the first building to enter a power savings mode and reduce its energy usage for a specified period of time (e.g., 15 minutes) and/or at a specific time (e.g., at 2 PM). The power saving mode can be achieved by (a) disconnecting any of the high energy devices (e.g., air conditioners) at the first building from the power lines associated with the energy company (hereinafter referred to as the "main power lines"), (b) lowering the voltage applied to the high energy devices or slowing down the high energy devices, (c) cycling the high energy devices, (d) turning on generators, and (e) any combination of (a)-(d) within the constraints of the building operation such that the building does not go out of constraints (temperature, airflow, process, run-time, etc.). In (a), the high energy devices are turned off which causes the first building to run without the high energy device(s) for a period of time. In (d), the first building can switch to generator power for that high energy device such that the first building has to bear the cost of running that high energy device. The way that a building turns off power might be determined by a set of instructions, by the marginal value of the running that equipment within the build or by manual control. As discussed above, the saved power can be used to reduce the energy company's needs or, if the energy company has enough power, sold to the market.

At the end of the time period, the first building can reconnect the previously disconnected high energy devices to the main power lines.

Prior to the first building getting ready to exit the power savings mode, the energy usage coordinator contacts a second building in its portfolio to request that the second building enter a power savings mode and reduce its energy usage for a specified period of time (e.g., 15 minutes) and/or at a specific time (e.g., at 2:15 PM). As with the first building, this can be done by (a) disconnecting any of the high energy devices (e.g., air conditioners) at the second building from the main power lines, (b) lowering the voltage applied to the high energy devices or slowing down the high energy devices, (c) cycling the high energy devices, (d) turning on generators, and (e) any combination of (a)-(d). This process then continues on for each of the remaining buildings in a portfolio (e.g., in non-overlapping 15 minute increments) such that the overall energy usage of the portfolio is reduced (1) during times when the energy company would have otherwise had to buy additional energy under unfavorable terms or (2) in order to sell excess power to the market.

The various requests needed to reach a target energy usage can be sent out to all necessary buildings before any building reduces its energy usage (e.g., such that an optimal pre-established order of reductions can be calculated in advance). Alternatively, the various requests needed to reach a target energy usage can be sent out to all necessary buildings on a rolling basis such that some buildings only receive their request to reduce usage after at least one building in the portfolio has already its energy usage. Likewise, the order can be determined by which buildings value the electricity the least at a point in time. Buildings that value electricity the lowest get called first.

As discussed, the above methods work during times when the energy company would have otherwise had to buy additional energy under unfavorable terms, as well as when the energy company determines that the amount of energy that it could save by reducing usage has a sufficiently high value that the energy company may wish to sell the saved energy into one of the available markets (e.g., the capacity, ancillary and energy markets). For example, the energy company may determine from a market information service 140 that the energy market is currently selling energy for twice what its building portfolio has contracted to pay for it. Instead of selling it to the building portfolio by allowing the building portfolio to use it, the energy company through the energy usage coordinator informs the buildings of the portfolio to reduce their energy usage as described above. Because the energy company now has excess energy over what its portfolio is projected to need, the energy company can sell it in the market (e.g., spot market or day ahead market) for a profit. (This profit would have to be sufficient to offset the fixed and/or variable rate reductions owed to the customers of the portfolio because of their reductions in order for it to be beneficial to the energy company.) The excess energy could also be used to cover the energy company's short position, if it exists, such that the energy company does not have to buy it from a market (e.g., the real time or day ahead markets).

Under the above processes (as well as other processes described herein), the energy usage coordinator would verify via the energy usage meters 110 that the energy usage of the buildings was actually reduced to determine if the buildings actually were in compliance with their agreements. If a building did not reduce its energy usage when requested to do so, a penalty may be applied. Such a penalty may include, but is not limited to, (1) increasing its rate to what it would have paid had it not previously agreed to reduce its usage, (2) paying for the cost to the energy company associated with having to purchase additional energy on the corresponding market plus an additional percentage or flat fee, or (3) having to agree to an additional number of energy reduction requests in the future. A combination of penalties is also possible.

The sending of a reduction request can take any number of forms that enable the energy usage coordinator to communicate directly or indirectly or manually with controllers for the high energy devices of the buildings in the portfolio. Such controllers may either be internal to or external to the high energy devices, and the controllers may either be dedicated to individual high energy devices or shared between high energy devices. The controllers may utilize any control interface for communicating with the high energy devices. For example, an internal computer bus may be used when the controller is internal to the high energy device. Alternatively, a control interface such as a serial connection (e.g., an RS-232 connection or a USB connection), a wireless connection or a parallel connection can be used when the controller is an external controller. These controllers can be connected to a building automation system.

Such controllers may use any number of communications adapters for communicating with the energy usage coordinator or other information services. For example, the energy usage coordinator can use a telephone dialing device to contact a telephone-based controller (e.g., PSTN-based, cellular-based or VoIP-based) connected to the high energy devices of a building. The controller could then receive DTMF- or modem-based commands informing it of when and/or for how long to reduce energy usage in the building. Alternatively, the energy usage coordinator could use a network adapter to establish IP-communication-based connections (e.g., using TCP/IP, RDP/IP or UDP/IP) between the energy usage coordinator and the controllers at the various buildings. Telephone-based communications would further include GPRS and any other data service for mobile phones.

IP-communication-based connections may be made using one or a combination of wire-based or wireless communications protocols (e.g., Ethernet, WiFi using the 802.11 family of protocols, WiMax and ZigBee). In one embodiment where the controllers use TCP/IP-based communications, the controllers include a World Wide Web interface where the energy usage coordinator (or a user working on its behalf) can connect to the controller, authenticate itself to the controller, and then issue an energy reduction request for a particular time and/or time period either programmatically or with an HTML form sent from the controller. Alternatively, a gateway may communicate (directly or indirectly) with the controller or a building automation system that communicates with the controller. The communication from the gateway to the controller can use any of the communications adapters and protocols discussed above.

Figure 2:
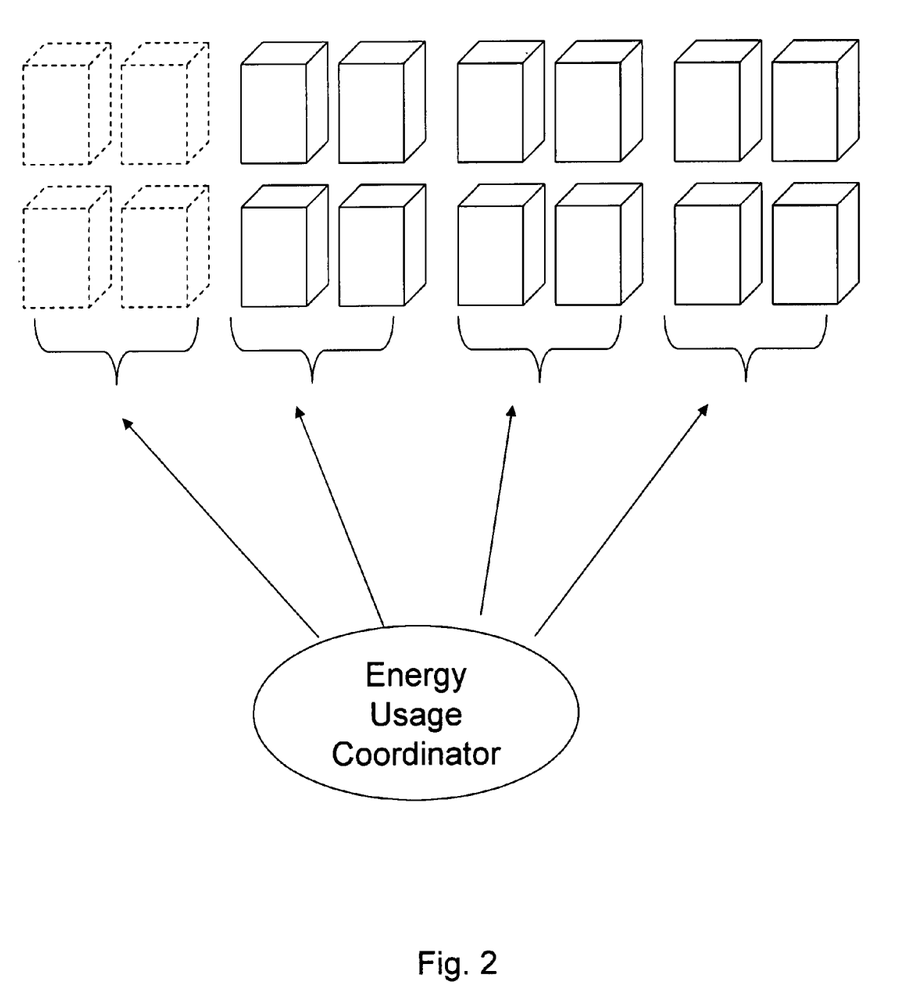
FIG. 2 is a schematic illustration of an energy usage coordinator controlling the energy usage of groups of buildings of a portfolio of buildings.

As shown in FIG. 2, the same process described above for individual buildings can be used for groups of buildings. The exemplary energy usage coordinator controls multiple (e.g., 4) buildings per group in a portfolio and requests that all of the buildings in a first group reduce their energy usage for a specified period of time (e.g., 15 minutes) and/or at a specific time (e.g., at 2 PM). The process then repeats for the remaining groups of buildings in the portfolio. While FIG. 2 is illustrated as having the same number of buildings in each group, different numbers of buildings per group can be used instead. Also, while all the buildings of a group are illustrated to be complying with a reduction request at the same time, less than all of the buildings (e.g., a half or a quarter) in the group may be requested to comply during a first time period while the remaining buildings in the first group are requested to comply at a later period without having any of the other groups complying with a request for a period simultaneous with the first group's period(s).

Figure 3:
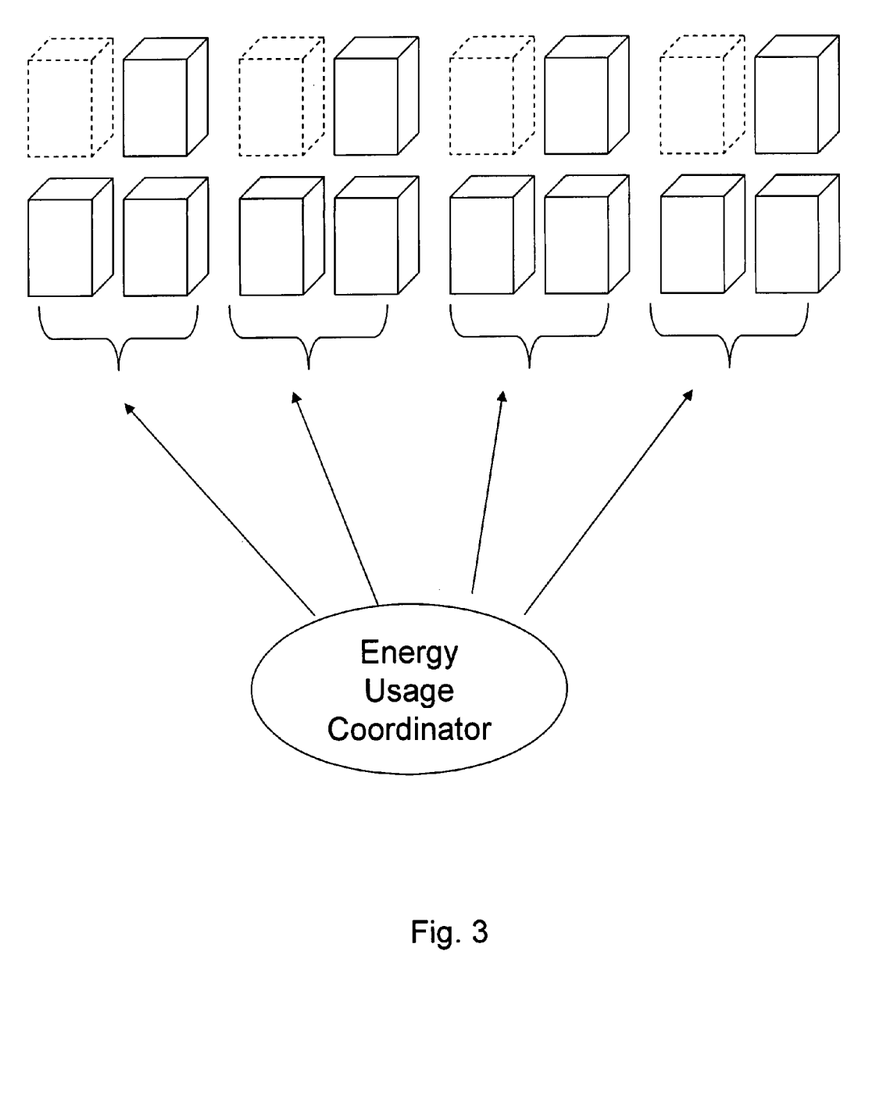
FIG. 3 is a schematic illustration of an energy usage coordinator controlling the energy usage of individual buildings of groups of buildings in a portfolio of buildings.

As shown in FIG. 3, the same process described above for individual buildings can be used for groups of buildings where only a subset of buildings per group are requested to reduce usage at a time. The exemplary energy usage coordinator controls multiple (e.g., 4) groups in a portfolio simultaneously and requests that at least one of the buildings in the group reduces its energy usage for a specified period of time (e.g., 15 minutes) and/or at a specific time (e.g., at 2 PM). The process then repeats for the remaining buildings of the various groups in the portfolio. Also, while all the groups are illustrated to have received requests for reduced usage for a single time period, less than all of the groups (e.g., a half or a quarter) in the portfolio may receive a request for a first time period while the remaining groups receive their requests for a later period. The sequencing of the building within the group could be determined by the group, by the relative value of the power to each building with the group or by negotiation among the group members.

Figure 4:
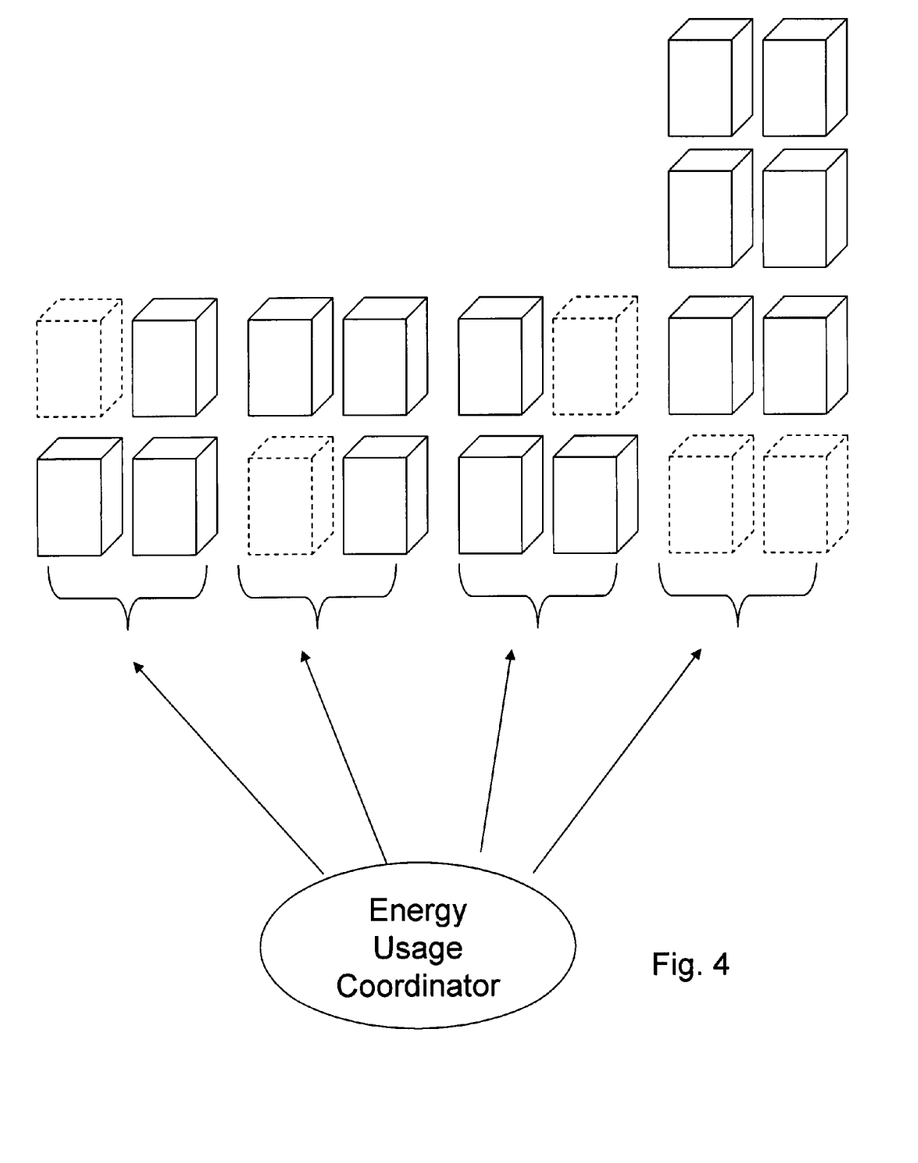
FIG. 4 is a schematic illustration of an energy usage coordinator controlling the energy usage of individual buildings of groups of buildings in a portfolio of buildings.

As shown in FIG. 4, the same process described above for individual buildings can be used for groups of buildings where a different number of buildings per group may be controlled on a group-by-group basis. Because of differences in how much energy can be reduced in the last group of buildings as compared with the other groups, the illustrated energy usage coordinator requests energy reductions in (a) one building per group for three of its groups and (b) two buildings in the last group to achieve the same amount of reduction between the four groups. These reductions may be for the same time period for all the groups or may be for sequential time periods. The amount of saved (or reduced power) need not be the same between each group or between each time period.

Figure 5:
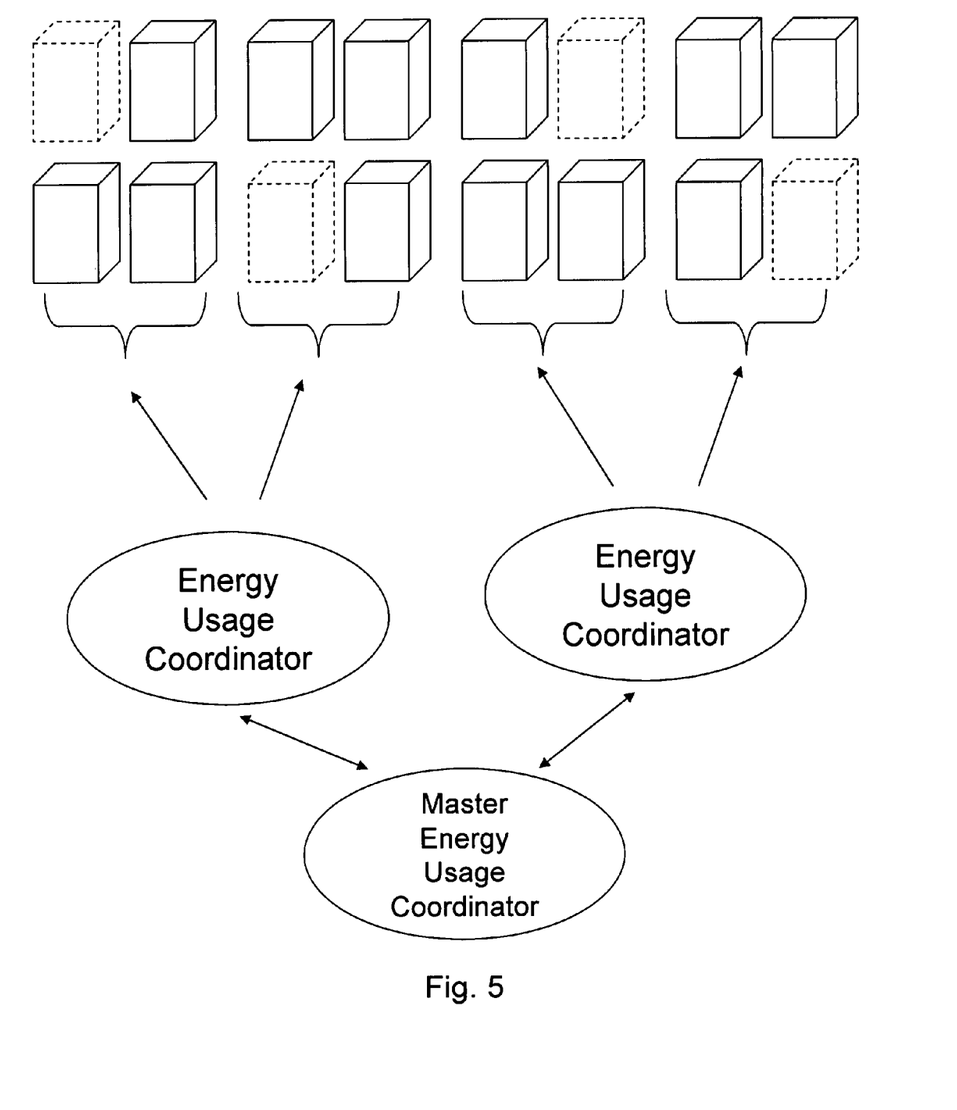
FIG. 5 is a schematic illustration of a hierarchy of energy usage coordinators controlling the energy usage of individual buildings and/or groups of buildings in a portfolio of buildings.

As shown in FIG. 5, a hierarchy of energy usage coordinators can be used to control the energy usage within their assigned groups. In such a configuration, the master energy usage coordinator requests certain levels of energy reduction per controller and then leaves the decision about how to achieve that energy reduction up to the individual (local) energy usage coordinators.

While the embodiments of FIGS. 1-5 have been discussed with respect to the energy usage coordinator sending requests to the buildings in the portfolio, bi-directional communication is also possible. For example, a building may need to inform the energy usage coordinator that it cannot comply with a received request for a reduction in energy usage at a particular time. This may occur, for example, if the high energy devices are already off such that no additional energy savings can be achieved. This response could be in the form of a "cannot comply" message. In this case the energy coordinator would then request a load from the next in line facility. As discussed earlier the next facility could be determined by the value of power or by a sequence (e.g., a random sequence or a pre-determined sequence).

The bi-directional communication can alternatively be used by a building to notify the energy usage coordinator that it will not or cannot reduce its energy usage at the specified time but that it could alternatively reduce energy usage at other times, if known. For example, if a cooling cycle just started, the building could respond by notifying the energy usage coordinator that it could reduce energy usage in 30 minutes. This may enable the energy usage coordinator to reorder how it requests energy reductions in buildings in the portfolio. In addition the building may provide forecasts of its expected energy use for the energy usage coordinator to use instead of the energy coordinator's (or the energy company's) based on data collected within the building or supplied to the building. This information coupled with the demand curve for the building provides the energy coordinator the necessary information to determine when and for how much to curtail the building.

Figure 6:
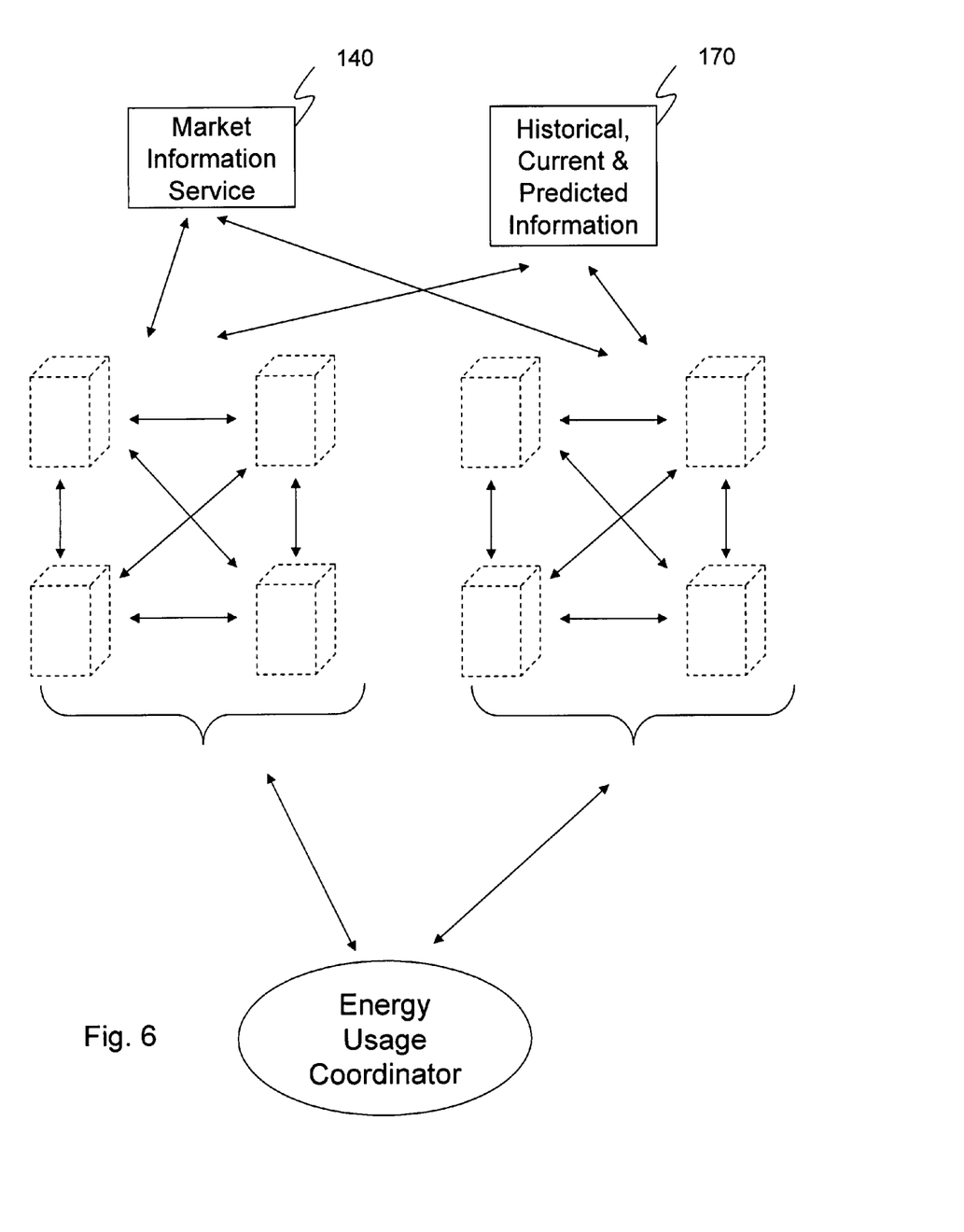
FIG. 6 is a schematic illustration of an energy usage coordinator controlling the energy usage of a group of buildings (using distributed control) in a portfolio of buildings.

As shown in FIG. 6, bi-directional communication can further be used to enable a group of buildings to decide between themselves which buildings, if any, of the group can respond to a reduction request, and by how much and for how long. This decision between themselves may be based on the relative value of electricity within each building. The buildings can then report the result(s) back to the energy usage coordinator who can then coordinate with other groups, if necessary, to meet the company's target energy usage level. As discussed above, this target energy usage level may be set for any number of reasons, including, but not limited to, avoiding going over the energy company's projected usage or reducing energy usage to take advantage of a favorable resale value for the energy that the buildings would have otherwise used.

The teachings described herein can additionally be performed in a cooperative manner instead of a command manner. That is, instead of the energy usage coordinator requesting that buildings comply with requests or face penalties, the energy usage coordinator could instead query buildings within the group to find out what the value to the building is for reducing its energy usage at the present time or at a future time (e.g., 1 hour later to many years in the future). For example, when there are favorable conditions in one of the energy markets, the energy usage coordinator may ask one or more buildings what kind of rate reduction or rebate or credit the building would need to be given in order to reduce its energy usage now or in the future. Such a determination may require that the buildings be given or obtain for themselves information on historical, current or predicted market conditions (from a market information service 140) and/or other historical, current or predicted information (e.g., weather information) from historical, current and predicted information services 170. If the energy usage coordinator received results that indicated that the profit would be significant enough to warrant reselling the unused power, the energy usage coordinator would request that the buildings commit to that reduction and the energy company would resell the unused energy.

Alternatively, the energy usage coordinator may simply ask if there are any buildings that would reduce energy usage for a particular credit or rebate. If an insufficient number of buildings responded affirmatively, then the energy usage coordinator may be forced to raise its bid and try again. When the energy usage coordinator has a sufficient number of confirmed reductions, it can decide to either commit to the sale or not. In either cooperative technique, the price that the energy company sells the unused energy for would typically be greater than its bid to the buildings or the price at which it purchased the energy from the buildings.

While portions of the above discussion have been made with reference to energy reductions prompted by the energy usage coordinator 100, the reverse is also possible. For example, one or more buildings within the portfolio may wish to request to reduce load in exchange for financial compensation or may request additional load at lower than their current rate if the market has lower priced power. To do this, the building requests that the energy usage coordinator obtain bids for the excess energy. Reasons that a building may wish to reduce load include, but are not limited to: (a) to avoid setting a new peak which will impact demand and capacity charges, (b) to take advantage of when the marginal cost of power is lower than the marginal benefit of utilizing that power, especially during periods of high hourly prices, and (c) requests to shed load from companies other than the energy company with whom they have a contract (e.g., the utility, supplier or ISO).

A building may also determine that additional energy is needed such that it wishes to enter an increased power mode. To determine if it is economical to do so, a building requests that the energy usage coordinator obtain bids for the needed energy and, if the bid is below the marginal demand curve, then the building may obtain the excess/additional energy.

In addition to the energy usage meters 110, the energy usage coordinator may communicate with temperature measurement devices which monitor the temperature of buildings in the portfolio to determine a number of conditions. Such conditions include, but are not limited to, whether the building is already too hot to try to request a reduction in energy usage, whether the building is warming more quickly than anticipated and an energy reduction of the building needs to be canceled, and whether the temperature part way through or after an energy reduction indicates that the period of energy reduction could or should be extended.

Additional factors (historical, real-time and predicted) that may be used to determine whether to request usage reductions, whether to sell capacity, and/or to help forecast usage include but are not limited to: the time and the date, weekday vs. weekend, weather measurements (temperature, wind speed, sunshine, humidity, etc.), energy usage indicators (such as building occupancy, number of filled or booked rooms, beds filled, customers in the store), measures of the building's condition (such as inside temperature, lumens, and air flow), measure of the electricity market value (such as hourly prices, day-ahead prices, forward prices, capacity prices, congestion prices, locational marginal prices, distribution prices, transmission prices, ancillary services prices) and measures of the other commodity values (e.g., gas, oil, metals, plastics).

Controllers associated with the high energy devices may also be programmed with processing rules by a building manager or the energy usage coordinator such that the controllers can respond to various changing conditions without having to be contacted by the energy usage coordinator. Such autonomous control would allow the controllers to react more quickly to potentially take advantage of advantageous conditions and/or avoid disadvantageous conditions. For example, by tracking information from market information services 140 and/or from historical, current and predicted information services 170, a controller may be programmed to reduce energy usage autonomously if (1) the outside temperature reaches 95 degrees and the market price for electricity in one or more of the short term markets has increased by more than 50%, (2) the real-time energy prices reach $500/MW hr and forecasted temperatures for the next four hours drop by 10 degrees, and (3) the building (or a group of cooperatively operating buildings of a customer) is reaching 95% of its annual peak demand and real-time energy prices reach $300/MW hr. Numerous other conditions are possible without departing from the teachings herein.

Alternatively, a gateway may be programmed with the processing rules by the building manager or the energy usage coordinator such that the gateway controls the controllers which can then respond to various changing conditions without having to be contacted by the energy usage coordinator.

Communications between the building and the energy company may occur through the use of an open or a proprietary interface. In an exemplary interface, a gateway includes a communications interface that communicates with the energy company. The interface service may be a web-service or another network data exchange protocol (HTTP, GPRS, TCP/IP). The interface service may utilize push and/or pull transactions. In one such embodiment, information is passed between the gateway and the energy company at various times and/or after the occurrence of certain events to communicate information between the gateway and the energy company. For example, load and other data points may be sent between the gateway and the energy company, and/or the energy company may send prices (e.g., hourly, sub-hourly, daily, monthly etc.) to the building(s) via the gateway. Alternatively, bids or event signals of different types (including length of event, amount of load or specific equipment turn on/off or variable changes) can be sent. Similarly, future load schedules or baselines can be sent between the gateway and the energy company. Likewise, acknowledgements and verified event compliance data can be sent. Furthermore, building monitored points data (inside temp, air flow, etc.) and/or updated availability of load to be dispatched may be sent.

The interface logically includes three functional components: (1) an energy company-side component, (2) a gateway- or controller-side component and (3) the information or transaction that goes between the components on the two sides (e.g., as described in the previous paragraph). The energy company-side component typically will reside on a server under the control of the energy company and remote from the customer. The gateway- or controller-side component will typically reside in the customer's building automation system, on the customer's PC or on a gateway associated with the customer. The gateway- or controller-side component associated with the customer will preferably include support for different IT platforms/chipsets (Windows, Linux) and software development languages (Java, C, etc.) and databases (SQL, Proprietary etc.)

Energy usage coordinators are described herein can be implemented in hardware (e.g., using ASICs) or in software running on a general purpose computer, or in a combination of both. Moreover, the software may be embedded on a computer readable memory (e.g., a CD, a DVD or flash memory) and control the processor of the general purpose computer to achieve the above described functionality, using one or more processes, each with one or more threads of control. The energy usage coordinators may additional store information in and retrieve information from at least one database each of which can be either local to or remote from the general purpose computer. Energy usage coordinators may additionally be agents of an energy company whose contracts with the building and/or provides energy to the building (directly or indirectly).

In addition to the other functions that are described above, the controllers and/or gateways can further be programmed to act as feedback-based energy estimators. A building (e.g., a factory, a hotel, a hospital, a store or a conference center) makes an initial estimate of its energy needs for a specified time in the future (e.g., a month or a week ahead) according to a first set of predicted conditions, and then over time, in conjunction with the energy company, revises its initial estimate (and subsequent estimates) based on the costs of the energy predicted or quoted by the energy company. For example, if a factory has been producing, on average, 300 widgets per day of various types, the factory's energy controller is programmed to track and/or predict the amount of energy required to make another 300 widgets for the specified period in the future (e.g., based on the types of widgets to be made at that time). The controller may further be programmed to receive predictive information that may affect the building's energy needs (e.g., the predicted temperature for the time of the predicted energy needs). Based on the predicted energy needs, the building (through its controllers and/or gateway) can inform the energy company of the amount of energy that the energy company should initially expect to procure for the building.

Later, as expectations change (or as predicted factors such as temperature change), the building may inform the energy company of the additional energy that will be needed (e.g., if the predicted temperature is increasing and cooling will be needed) or the excess energy that is expected (e.g., if the predicted temperature is decreasing and less cooling will be needed). By providing advanced notice, the energy company can respond in one of several ways. First, it can simply buy or sell the additional energy without further consulting with the building (through its gateway and/or controllers). Second, it can buy or sell options on energy to ensure that it can buy or sell the needed energy without having to commit to the actual purchase or sale of the energy. Lastly, it can price the change in energy needs into the market to determine what the change in energy usage (e.g., the additional energy usage) will cost. The energy company can then inform the controllers and/or gateways of the associated costs for the change to determine if the change is still desired. For example, in the case of the factory, if the energy company were to report that the cost of the additional energy would be more than the expected profit on the additional goods to be made that day, then the factory may change its output expectations in order to stay in line with its original estimates (e.g., by leaving its predicted output at 300 widgets rather than increasing to 325 widgets to try to complete a "rush" order).

At an even later time, the factory may again recalculate its expected energy needs to determine if they are still consistent with its reported expectations. Again, if not, the new energy usage can be reported to the energy company so that energy or options can be bought, sold, or energy can priced to determine if further changes are needed. This repetitive feedback process can be started as far out as the factory can predict its energy needs with a desired degree of certainty. The recalculation phase can then occur at one or more known intervals (e.g., every month or week and/or as the actual usage gets closer every day or every hour). Rather than time-based updated, event or demand based updates can also be used. For example, if the number of widgets to be made on a particular day changes (such as when a new order is made or an order is canceled), the energy estimate can be recalculated and transmitted to the energy company.

While the above feedback process has been described in conjunction with a factory, any other building type with predicted energy needs can be used. For example, a hotel may predict its energy usage based on the number of guests that are registered to stay on a particular day (along with the predicted temperature information). As the number of guests increases and decreases, the hotel can update its predicted energy needs. Similarly, as a conference center books additional conferences or cancels previously scheduled conferences, it can update its expected energy usage as well.

While certain configurations of structures have been illustrated for the purposes of presenting the basic structures of the present invention, one of ordinary skill in the art will appreciate that other variations are possible which would still fall within the scope of the appended claims.

The invention claimed is:

1. A system for controlling energy usage within a portfolio of buildings, each building receiving energy service from a same energy company, the system comprising:
    an energy usage estimation system for tracking a projected energy usage of the buildings in the portfolio of buildings and for determining if a condition requires a change in energy usage by at least one building in the portfolio of buildings; and
    an energy usage coordinator for communicating (1) a first request with a first controller of a first high energy device at a first building in the portfolio of buildings to request that the first high energy device enter a different power mode and (2) a second request with a second controller of a second high energy device at a second building in the portfolio of buildings to request that the second high energy device enter a different power mode.

2. The system as claimed in claim 1, wherein the different power mode is a power savings mode.

3. The system as claimed in claim 2, wherein the power savings mode is entered by disconnecting the first high energy device from energy supplied by the energy company.

4. The system as claimed in claim 2, wherein the first high energy device is an air conditioning unit.

5. The system as claimed in claim 2, wherein the second high energy device is an air conditioning unit.

6. The system as claimed in claim 2, wherein the first and second controllers are a single controller shared by and controlling both the first and second high energy devices.

7. The system as claimed in claim 2, wherein the first and second requests are for the same time period.

8. The system as claimed in claim 2, wherein the first and second requests are for sequential time periods.

9. The system as claimed in claim 2, wherein the first and second requests are for different time periods.

10. The system as claimed in claim 2, wherein the first and second requests are a single shared request for all buildings in a group of buildings such that all the buildings in the group of buildings are requested to reduce their energy usage for the same time period.

11. The system as claimed in claim 2, further comprising a telephone dialing device for establishing telephone-based communication between the energy usage coordinator and the first controller.

12. The system as claimed in claim 2, further comprising a network adapter for establishing IP-based communication between the energy usage coordinator and the first controller.

13. The system as claimed in claim 2, wherein the condition is a potential overage in an amount of energy estimated to be used by the portfolio of buildings for a particular day.

14. The system as claimed in claim 2, wherein the condition is a calculated profit in the market by reselling energy saved by the first and second requests.

15. The system as claimed in claim 2, wherein the energy usage estimation system further tracks baseline energy usage of at least one building of the portfolio of buildings.

16. The system as claimed in claim 2, wherein the energy usage estimation system further tracks baseline energy usage of at least one building of the portfolio of buildings to determine an amount of energy to be made available based on a marginal demand curve.

17. The system as claimed in claim 2, wherein the energy usage coordinator communicates the first request to the first controller via a world wide web interface.

18. A method for controlling energy usage within a portfolio of buildings, each building receiving energy service from a same energy company, the method comprising:

tracking a projected energy usage of the buildings in the portfolio of buildings;

determining if a condition requires a change in energy usage by at least one building in the portfolio of buildings;

communicating a first request with a first controller of a first high energy device at a first building in the portfolio of buildings to request that the first high energy device enter a different power mode; and communicating a second request with a second controller of a second high energy device at a second building in the portfolio of buildings to request that the second high energy device enter a different power mode.

19. The method as claimed in claim 18, wherein the different power mode is a power savings mode.

20. The method as claimed in claim 19, entering the power savings mode comprises disconnecting the first high energy device from energy supplied by the energy company.

21. The method as claimed in claim 19, wherein the first high energy device is an air conditioning unit.

22. The method as claimed in claim 19, wherein the second high energy device is an air conditioning unit.

23. The method as claimed in claim 19, wherein the first and second controllers are a single controller shared by and controlling both the first and second high energy devices.

24. The method as claimed in claim 19, wherein the first and second requests are for the same time period.

25. The method as claimed in claim 19, wherein the first and second requests are for sequential time periods.

26. The method as claimed in claim 19, wherein the first and second requests are for different time periods.

27. The method as claimed in claim 19, wherein the first and second requests are a single shared request for all buildings in a group of buildings such that all the buildings in the group of buildings are requested to reduce their energy usage for the same time period.

28. The method as claimed in claim 19, further comprising establishing telephone-based communication between the energy usage coordinator and the first controller.

29. The method as claimed in claim 19, further comprising establishing IP-based communication with the first controller.

30. The method as claimed in claim 19, wherein the condition is a potential overage in an amount of energy estimated to be used by the portfolio of buildings for a particular day.

31. The method as claimed in claim 19, wherein the condition is a calculated profit in the market by reselling energy saved by the first and second requests.

32. The method as claimed in claim 19, wherein tracking comprises tracking baseline energy usage of the buildings of the portfolio of buildings.

33. The method as claimed in claim 19, wherein tracking comprises tracking baseline energy usage of at least one building of the portfolio of buildings to determine an amount of energy to be made available based on a marginal demand curve.

34. The method as claimed in claim 33, further comprising selling the amount of energy to be made available based on the marginal demand curve.

35. The method as claimed in claim 19, further comprising selling energy not used by the at least one building in the portfolio of buildings because of the reduction in energy usage.

36. The method as claimed in claim 18, wherein the different power mode is an increased power mode.

37. The method as claimed in claim 36, wherein tracking comprises tracking baseline energy usage of at least one building of the portfolio of buildings to determine an additional amount of energy to request based on a marginal demand curve.

38. The method as claimed in claim 37, further comprising buying the additional amount of energy based on the marginal demand curve.

* * * * *